Patented June 12, 1934

1,962,175

UNITED STATES PATENT OFFICE 1,962,175

PROCESS FOR MAKING BENZOIC ACID FROM PHTHALIC ACID

Herbert W. Daudt, Wilmington, Del., assignor to E. I. du Pont de Nemours & Company, Wilmington, Del., a corporation of Delaware No Drawing. Application September 11, 1926, Serial No. 134,940

3 Claims. (Cl. 260—108)

This invention relates to an improved process for making benzoic acid from phthalic acid.

In U. S. Patent No. 1,551,373, Process of making benzoic acid, the present inventor, H. W. Daudt, described a new process for the production of benzoic acid, the principal characteristic of which was the conversion of phthalic acid or a compound thereof to benzoic acid in the presence of water at a temperature between 150 and 300° C., and preferably in the presence of an acid phthalate of an alkali-metal. As further described, the invention could proceed (a) by heating an aqueous solution of phthalic acid; (b) by heating the aqueous solution of a neutral alkali-metal phthalate; (c) by heating a solution containing both free phthalic acid and a phthalic acid salt of certain metals. It has been found that more complete conversions are obtained under method (c) than under method (b).

The present invention involves a different mode of procedure from that of the foregoing patent, as will appear from the description of a preferred embodiment thereof, which is, however, to be taken as illustrative merely and not by way of limitation of the invention. The following example is accordingly illustrative of our procedure:

A copper tube is provided with an inlet tube for steam and an inlet tube for phthalic anhydride and also an outlet tube for the effluent gases. The tube is filled with asbestos previously impregnated with nickel phthalate solution and subsequently dried. When ready for use the inlet end of the tube is heated to 175 to 185° C. and the remaining portion to 275 to 300° C., and a gentle stream of steam is passed through the s'eam tube while, by means of a gentle current of air, phthalic anhydride is passed in. The effluent gases and vapors are cooled by means of a suitable condensing system. By a proper adjustment of the latter the major portion of the unconverted phthalic acid and phthalic anhydride can be condensed together with some of the water in the section of the condenser close to the copper tube, whereas most of the benzoic acid will pass along to the other end of the condenser with the remaining water. The benzoic acid is separated from its mother liquor by means of a filtration, and may, if desirable, be purified by dissolving in hot water and then allowing it to crystallize out.

Additional benzoic acid may be recovered from the nearer section of the condenser by completely dissolving the solid material, most of which is phthalic acid and anhydride, in water and crystallizing out carefully the benzoic acid from the solution. The passage of the materials or vapors through the tube may be induced by pressure of the water vapor or by a current of air or by both, or by some other means.

The use of the phthalic acid salt is highly advantageous in this process, inasmuch as it acts as a carrier; that is to say, it has the property of being converted in the presence of phthalic acid to a benzoate and carbon dioxide, whereas the benzoate in turn is acted upon by additional phthalic acid to cause the liberation of benzoic acid and the regeneration of the phthalic acid salt. It will be evident that there may be used instead of the metal phthalate itself any compound of the metal, such as the hydroxide or acetate, which, under the conditions recited, will be easily converted to the phthalate.

We have found that nickel phthalate has a marked beneficial influence on the conversion, having been found to be operative over a period of twenty-four hours, with conversions of 45 to 65%. Nickel phthalate decomposes on heating to 225° C. to form appreciable quantities of benzoates or benzoic acid, and at temperature above 300° C. benzoic acid sublimes from the mass. The products obtained with temperatures much below 300° C. should be treated with an aqueous solution of an acid in order to obtain free benzoic acid. Copper phthalate also possesses a marked advantage, but its use is accompanied with a reduction to metallic copper which shortens the life of the copper phthalate carrier, whereas the use of the nickel salt encounters this difficulty only to a much smaller degree. In the case of the copper salt, only strong mineral acids will suffice, whereas with the nickel salt phthalic acid will precipitate benzoic acid and regenerate nickel phthalate. Inert materials, such as asbestos, do not of themselves occasion high conversions, but the presence of phthalates of the alkali-metals will, as described above, much increase the percentage conversion to benzoic acid. Phthalates of the alkali-metals, of the alkaline earth metals, of zinc, and of other metals have been found to be suitable.

The converter is held at a temperature of 175 to 350° C., the lower limit being preferable at the point where the vapors are mixed and the higher temperature where the effluent vapors leave the converter. With nickel phthalate a preferred temperature range is 225 to 350° C., and the preferred temperature will, of course, vary for particular phthalates.

As distinguished from the aforesaid patent, the present invention comprises the formation of benzoic acid by the interaction of phthalic acid and water in the vapor phase and at temperatures ranging from about 175 to 350° C., and particularly in the passage of the interacting substances through a vessel maintained at such temperature. The term "water" in this connection is broadly used to designate H2O in whatever form it may occur under the conditions of operation, which are above the normal boiling point of water, and the phthalic acid may be in the form of its anhydride as disclosed in the foregoing embodiment, or in some equivalent form.

The various modifications of the invention may be made without departing from the spirit thereof, and it is to be understood that the invention is not limited to the specific embodiment described nor to the conditions of operation described, except as stated in the following patent claims.

I claim:

1. The formation of benzoic acid by the interaction of phthalic anhydride and water in the vapor phase at a temperature of 175 to 350° C. and in the presence of nickel phthalate.

2. The formation of benzoic acid by the interaction of phthalic anhydride and water in the vapor phase at a temperature of 175 to 350° C. in the presence of a phthalate of a member of the group consisting of the alkali metals, the alkaline earth metals and nickel.

3. In the process of forming benzoic acid from phthalic anhydride, the step which comprises heating nickel phthalate to a temperature of 225 to 350° C. and then bringing phthalic anhydride and water vapor into contact with the nickel phthalate.

HERBERT W. DAUDT.